United States Patent [19]

Garrick

[11] 4,183,886
[45] Jan. 15, 1980

[54] CHEMICAL METHOD FOR EMBOSSING A CERAMIC ACOUSTICAL PRODUCT

[75] Inventor: John R. Garrick, Lancaster, Pa.

[73] Assignee: Armstrong Cork Company, Lancaster, Pa.

[21] Appl. No.: 524,772

[22] Filed: Nov. 18, 1974

[51] Int. Cl.² .............................................. C04B 33/34
[52] U.S. Cl. ....................................... 264/62; 264/119
[58] Field of Search ................... 264/60, 62, 119, 131; 427/275, 276, 399; 181/336 A

[56] References Cited

U.S. PATENT DOCUMENTS 2,791,020  5/1957  Heine ....................................... 264/60
2,825,420  3/1958  Heine ....................................... 264/60

FOREIGN PATENT DOCUMENTS 253184  6/1926  United Kingdom ...................... 264/60

Primary Examiner—Donald J. Arnold
Assistant Examiner—John A. Parrish

[57] ABSTRACT

An acoustical board comprised of felted mineral wool and clay is embossed by applying an aqueous dispersion of lithium carbonate and borax to selected areas of the board surface, drying the coating and firing at a temperature in the range of from about 1200° F. to 1600° F. A prime clay coat may be provided which acts as a barrier and gives better control of board embossing.

8 Claims, 3 Drawing Figures

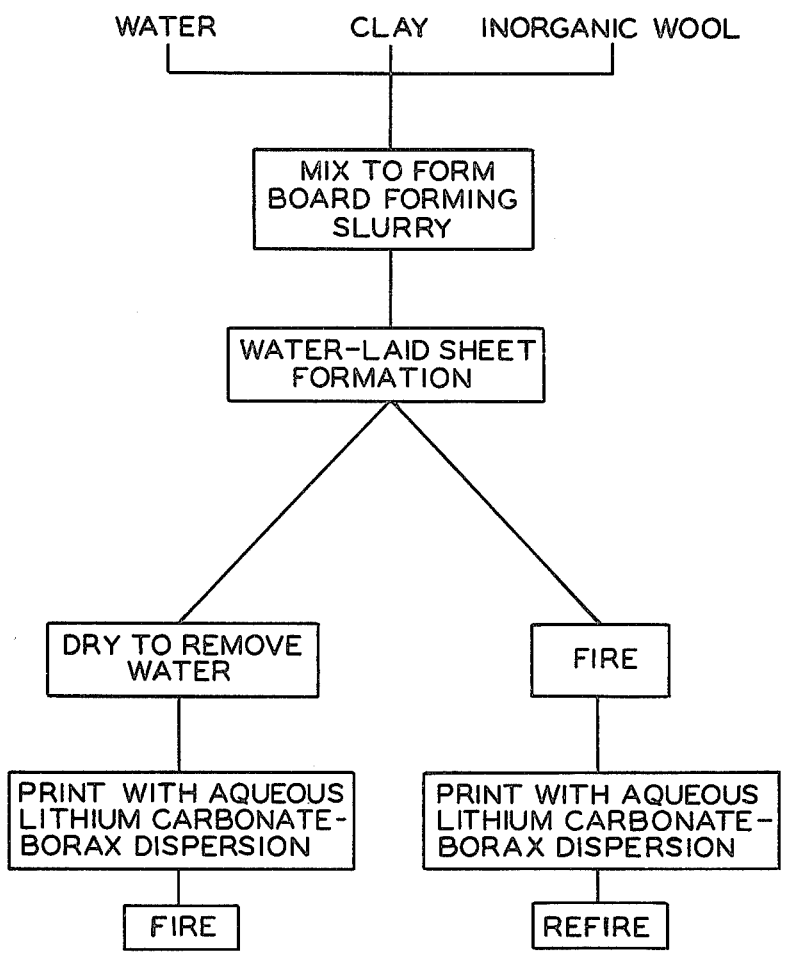

CHEMICAL METHOD FOR EMBOSSING A CERAMIC ACOUSTICAL PRODUCT

BACKGROUND OF THE INVENTION

1. Field of the Invention

This invention relates generally to a chemical method for embossing a ceramic acoustical product.

2. Description of the Prior Art

A method for making a ceramic acoustical product is disclosed in U.S. Pat. No. 3,371,134-Ollinger. A low-density, light-colored ceramic acoustical board, which is both incombustible and dimensionally stable, is formed by slurrying water, inorganic wool, and a clay having the characteristics of Mississippi M & D clay; forming a water laid sheet from said slurry; and drying and firing the sheet at a temperature in the range of 1000° F. to 1600° F. to form a ceramic bond. Surface texture has been provided to such board products by using conventional punching techniques to open up and form a disrupted surface or by embossing the unfired board prior to firing. Both techniques have been found to adversely affect the overall strength of the board. The mechanical disruption serves to weaken the board and the embossing of the unfired board interferes with the fired strength since it disrupts the intimately felted product and interferes with the ability of the clay particles to form good bonds.

Other methods for forming acoustical tile products having cratered surfaces are also disclosed in U.S. Pat. No. 2,791,020-Heine and U.S. Pat. No. 2,825,420-Heine.

SUMMARY OF THE INVENTION

This invention is concerned with ceramic acoustical products of the type disclosed in U.S. Pat. No. 3,371,134-Ollinger wherein water, mineral wool, and Mississippi M & D clay are slurried and deposited on a foraminous surface to form a water laid sheet comprised of felted mineral wool and clay. Generally the board solids are comprised of from about 20 to 65 percent by weight clay and 35 to 86 percent by weight wool. Water is removed and the sheet is dried and fired at a temperature in the range of 1000° F. to 1600° F. to form a ceramic bond. It is desirable with such sheets to disrupt the surface to form pleasing design effects and to improve the acoustical properties of the sheet.

I have found that the above described water laid felted sheet may be embossed by applying an aqueous dispersion of borax and lithium carbonate to pre-selected areas of the surface of the sheet. This dispersion may be applied after the sheet is first dried, after which the printed sheet is fired at a temperature in the range of about 1000° F. to 1600° F. or after the sheet has been fired between 1000° F. and 1600° F. and before refiring. At an elevated temperature, the lithium carbonate-borax mixture dries and fluxes, forming a fluid on the board surface which flows into the void spaces of the felted sheet and assimilates or dissolves the mineral fibers and clay with which it comes into contact. The degree of fluxing is controlled by the length of the firing cycle and by retardation of the fluxing action by assimilation of the high melting point clay. The fluid solidifies to form a glassy material and the overall strength of the embossed board is not significantly adversely affected.

It is preferred to coat the felted sheet overall with a clay prime coat after the application of the borax-lithium carbonate mixture to restrict the fluid flow from the printed areas on the board surface, thus achieving a more controllable embossed design.

BRIEF DESCRIPTION OF THE DRAWING

In the drawing, FIG. 1 is a flow sheet outlining the method of forming a chemically embossed board product;

FIG. 2 is a sectional view illustrating an embossed ceiling board formed in accordance with my invention; and FIG. 3 is a sectional view illustrating an embossed product when a clay prime coat is overprinted on the printed board.

DESCRIPTION OF THE PREFERRED EMBODIMENTS

This invention relates to a chemical method for embossing a ceramic acoustical product produced in accordance with the disclosure of U.S. Pat. No. 3,371,134-Ollinger. The invention is illustrated in FIG. 1 of the drawing wherein a flow sheet is set forth outlining the method of forming a chemically embossed board product.

In accordance with my invention, water, a clay having the clay characteristics of Mississippi M & D clay, and an inorganic wool are mixed to form a homogeneous slurry and the slurry is flowed out onto a foraminous surface, preferably fourdrinier-type board forming apparatus conventionally used in the manufacture of acoustical board products. Water is drained from the wet laid mat thus formed and the mat is dried to remove residual water remaining in the mat after drainage. At this point, an aqueous dispersion of borax and lithium carbonate is applied to pre-selected areas adjacent areas which are desired to be embossed and the board is fired in an oven at a temperature of between about 1000° F. and 1600° F. to form a ceramic bonded board product. At the elevated firing temperature, the borax and lithium carbonate flux to form a fluid which is absorbed by the voids in the board, which fluid dissolves both the mineral fibers and clay with which it comes into contact causing a subsequent embossing in the board adjacent the application point of said mixture. The lithium carbonate-borax fluid with mineral wool and clay dissolved therein solidifies to form a glassy material integral with the board substrate and the overall strength of the embossed board is not significantly adversely affected.

Alternatively, the dried mat may first be fired at a temperature within the range of from about 1000° F. to 1600° F., printed with a borax-lithium carbonate dispersion in the desired pattern, and refired at an elevated temperature at which the borax and lithium carbonate flux to form a fluid which in turn is absorbed by the voids and which dissolves clay and mineral wool with which it comes into contact, again causing a subsequent embossing in the board surface adjacent the application point of the mixture, the fluid solidifying to form a glassy solid integral with the board substrate.

As disclosed in U.S. Pat. No. 3,371,134, the disclosure of which patent is incorporated herein by reference, the slurry is initially prepared so that it contains water to the extent of from about 65% to 99% by weight. When the slurry is deposited on a board-making screen, it forms a water-laid sheet and the sheet is drained to give a board-like product containing from about 15% to 75% by weight of water after which the sheet is dried in an oven to remove the remaining water. The ceramic board product is formed from the dry sheet by firing the dried sheet at a temperature in the range of 1000° F. to 1600° F. In producing the board products of this invention, the solids present in the slurry are adjusted so that the water-laid sheet formed therefrom contains, based on the total weight of the solids, from 20% to 65% by weight of clay and from 35% to 80% of inorganic wool.

Any of the various varieties of inorganic wools may be used in the practice of this invention. Board products having particularly good acoustical and physical properties are formed using iron blast furnace slag wool or phosphate slag wool, although other inorganic fibers such as glass wool might be used. The clay which is preferred in the practice of this invention is a clay known as Mississippi M & D clay. It is a natural ball clay mined in the vicinity of Crenshaw, Miss., and is a natural mineral mixture essentially comprised of a mixture of kaolinite and montmorillinite. Obviously, other clays and/or clay mixtures having the clay characteristics of Mississippi M & D clay could be used in place of all or part of the Mississippi M & D clay. Generally speaking, the invention is applicable to any board-line product formed from a water slurry containing mineral fibers and clay which is later fired to form a ceramic board although the above described fiber and clay combination results in a board product having preferable physical properties and processing characteristics.

The length of firing at a temperature within the preferred firing temperature range of 1000° F. to 1600° F. must be sufficient to develop a strong ceramic bond throughout the product. For example, with a board about 1" in thickness and at a temperature of about 1300° F., a firing time of about ten minutes insures the development of a good ceramic bond. Obviously, the time would vary for either lower or higher temperatures and for thinner or thicker board products.

In embossing the board product above described and in accordance with my invention, a water dispersion containing lithium carbonate and borax is initially formed. The percent solids is not critical but is readily adjustable to give the dispersion its desired flow characteristics for ease respecting application techniques utilized and it is preferable, for ease in processing, to use a dispersion to which has been added a conventional thickener such as hydroxy methyl cellulose and a defoamer such as pine oil. Generally speaking, satisfactory dispersions are formed from 40 to 60 percent by weight, based on the total weights of solids present, of lithium carbonate and 40 to 60 percent by weight, based on total weight of solids, of borax. Borax is the commercial name for the naturally hydrated sodium borate, which is also identified chemically as sodium tetraborate and which has the formula $Na_2B_4O_7.10H_2O$. Either anhydrous borax ($Na_2B_4O_7$) or borax pentahydrate ($Na_2B_4O_7.5H_2O$) may be substituted in whole or in part for the sodium tetraborate with proper adjustment of weight fraction to account for water of hydration.

Depending on the consistency of the borax-lithium carbonate dispersion, this may be applied to the surface of the dried or fired board product in the desired pattern by screeding or spraying the dispersion through a stencil. When applied to the dried board product, the borax and lithium carbonate react when the board is fired at the desired temperature to form a fluid which is absorbed by the voids in the surface of the dried board dissolving clay and mineral fiber with which it comes into contact causing a subsequent embossing of the board adjacent the application point of the mixture. The degree of embossing is dependent on the firing temperature and time as well as the amount and type of clay in the board substrate, the fluid solidifying into a glassy state on cooling with the assimilation of clay acting to reduce the fluxing action.

It is also possible to form an embossed product after the dried board has been initially fired to form a ceramic bond throughout by applying to the fired board the above described borax-lithium carbonate dispersions in the desired pattern and refiring. Here a lower temperature is required to react flux lithium carbonate and borax and to form a fluid which is absorbed into the voids and which in turn absorbs the mineral wool and clay with which it comes into contact since a ceramic bond has already been established in the initial firing. When fired at higher temperatures, increased embossing is achieved.

The following examples will serve to illustrate this invention.

EXAMPLE 1

In preparing the board, a slurry containing 96.3% water and having a solids consistency of 3.7% by weight and of the following formulation was flowed from a head-box onto a fourdrinier screen to give a water-laid sheet approximately 12 feet in width.

| Solid Ingredients | % By Weight |
|---|---|
| Paper makers alum [aluminum sulphate] | 0.5 |
| Polyethylene oxide [polyox WSR-301, Union Carbide] | 0.05 |
| Iron blast furnace slag wool | 55.0 |
| Mississippi M & D Clay | 38.8 |
| Sodium bicarbonate [$NaHCO_3$] | 5.0 |
| Tapioca starch | 1.0 |

The average thickness of the sheet laid up on the fourdrinier screen was 0.740"; this thickness giving, on drying, an average density of 2.18 pounds per board foot and an average dry thickness of 0.687". Water was drained from the water-laid sheet on formation on the screen and by passing the sheet thus formed over a series of suction boxes and through a roll press where further water was pressed from the sheet and was removed by vacuum. The sheet thus formed, containing about 55.7% water, was cut into 12'×12' sections and passed through a drier where heated air at temperatures up to 600° F. was circulated around the sheets to remove the remaining water. The sections were then cut into panels of 4' by 6' dimensions which were then face sanded to a final thickness of 0.6". To a series of panels thus formed, stencils were applied to the sanded surface and a water dispersion containing 40.69 percent water and having a solids consistency of 59.31 percent of the following formulation was sprayed at an application rate of 18 grams per square foot onto the surface through the stencils.

| Solid Ingredients | % By Weight |
|---|---|
| Lithium Carbonate | 33.6 |
| Borax ($Na_2B_4O_7 . 10H_2O$) | 65.7 |
| Thickener (Hydroxy Methyl Cellulose) | .62 |
| Defoamer (Pine Oil) | 0.8 |

After drying the dispersion, the stencils were removed and the panels, printed in the configuration imparted by the stencils, were kiln fired at a temperature of 1400° F. for 6 minutes. The resultant panels were embossed in the pattern corresponding to the non-stenciled areas and to a maximum depth of about one tenth of the board thickness. The type of embossing is illustrated by the sectional view shown in FIG. 2, although FIG. 2, and FIG. 3 referred to below, are for illustrative purposes only and are not drawn to scale.

EXAMPLE 2

A second series of panels produced in accordance with the description set forth in Example 1, after drying but prior to printing, were fired in a kiln at a temperature of 1400° F. for 6 minutes and this series of panels were placed under stencils, also utilized under Example 1, and printed with the borax-lithium carbonate dispersion as described in Example 1. After drying and removing the stencils, the printed panels were refired at a temperature of 1400° F. for a time of 6 minutes. Again, they were embossed as illustrated in FIG. 2 and to a slightly greater depth than the embossing of Example 1.

EXAMPLE 3

Example 1 was repeated except that, after printing and drying the lithium carbonate-borax ink (17.5 grams per square foot dry weight) a standard prime coat was applied overall at a rate of 13 grams (wet) per square foot of board surface. On firing, this resulted in an embossed surface as illustrated in FIG. 3, and lateral embossing of the board surface was severely restricted by the clay.

| Clay Prime Coat Formulation | |
|---|---|
| Ingredient | Weight Percent |
| Water | 54.73 |
| Tetrasodium pyrophosphate | .23 |
| Mississippi M & D Clay | 28.28 |
| Tipure FF (type of clay) | 10.67 |
| Mica | 3.81 |
| Tipure R-901 (type of clay) | 2.28 |

What is claimed is:

1. In a process for forming a ceramic acoustical board product wherein a wet-laid mat is formed from an aqueous slurry of mineral fibers and clay, dried, and fired; the improvement comprising: chemically embossing the board by applying an aqueous dispersion of borax and lithium carbonate to the board surface to be embossed in a pattern corresponding to the desired embossed pattern, firing the printed board at a temperature sufficient to react the borax and lithium carbonate so as to form a fluid which is absorbed by the voids in the surface of the board, and which acts to dissolve mineral wool and clay in the board causing a subsequent embossing of the board surface adjacent the application point of said dispersion, and cooling the board to solidify the fluid and form a glassy material integral with the board substrate.

2. The method in accordance with claim 1 in which the board is fired at a temperature between about 1000° F. and 1600° F. for a period of time sufficient to form a ceramic bond after which the fired board is printed with the aqueous lithium carbonate-borax dispersion and refired to flux the lithium carbonate-borax mixture.

3. The method in accordance with claim 2 in which the dispersion comprises, 40 to 60 percent by weight lithium carbonate and 40 to 60 percent by weight borax, based on total weight solids.

4. The method in accordance with claim 1 in which a clay prime coat is applied to the board surface after drying the aqueous lithium carbonate-borax dispersion to restrict embossing to the printed area of said board.

5. The method in accordance with claim 3 in which a clay prime coat is applied to the board surface after drying the aqueous lithium carbonate-borax dispersion to restrict embossing to the printed area of said board.

6. In a method of forming a light colored ceramic acoustical board product wherein a slurry is formed of water, an inorganic wool, and a clay having the clay characteristics of Mississippi M & D clay; deposited on a board forming screen to form a water-laid sheet having, based on total solids, from about 20 to 65 percent by weight clay and from about 35 to 80 percent by weight of inorganic wool; and the sheet dried and then fired at a temperature within the range of about 1000° to 1600° F. to form a ceramic bond throughout the sheet, the improvement comprising: embossing the board by applying an aqueous dispersion of borax and lithium carbonate to the board surface in a pattern corresponding to the desired embossed pattern after drying the board but prior to the firing step.

7. The method in accordance with claim 6 in which the dispersion comprises, based on total solids, 40 to 60 percent by weight lithium carbonate and 40 to 60 percent by weight borax.

8. The method in accordance with claim 7 in which a clay prime coat is applied to the board surface after drying the aqueous lithium carbonate-borax dispersion to restrict embossing to the printed area of said board.

* * * * *